US006725995B2

(12) United States Patent
Yamagishi

(10) Patent No.: US 6,725,995 B2
(45) Date of Patent: Apr. 27, 2004

(54) DISCRIMINATION OBJECT DEFLECTING APPARATUS

(75) Inventor: Junichi Yamagishi, Taito-ku (JP)

(73) Assignee: Unirec Co., Ltd., Tokyo (JP)

( * ) Notice: Subject to any disclaimer, the term of this patent is extended or adjusted under 35 U.S.C. 154(b) by 113 days.

(21) Appl. No.: 10/074,136

(22) Filed: Feb. 12, 2002

(65) Prior Publication Data

US 2003/0150689 A1 Aug. 14, 2003

(51) Int. Cl.[7] ............................ G07D 5/00; G06K 9/00

(52) U.S. Cl. ....................... 194/328; 194/346; 382/136; 382/181

(58) Field of Search ................................ 194/328, 212, 194/302, 333; 382/136, 181, 135, 137, 194, 203; 73/163

(56) References Cited

U.S. PATENT DOCUMENTS

| | | | | | |
|---|---|---|---|---|---|
| 4,257,512 | A | * | 3/1981 | Hooker | 194/318 |
| 4,550,818 | A | * | 11/1985 | Holliday | 194/218 |
| 4,550,819 | A | * | 11/1985 | Smith | 194/218 |
| 5,164,997 | A | * | 11/1992 | Kumagai | 382/294 |
| 5,476,168 | A | * | 12/1995 | Malzard et al. | 194/203 |
| 5,494,147 | A | * | 2/1996 | Takahashi et al. | 194/328 |
| 5,515,960 | A | * | 5/1996 | Wood | 194/328 |
| 5,887,697 | A | * | 3/1999 | Takahashi et al. | 194/317 |
| 5,987,162 | A | * | 11/1999 | Nakata | 382/152 |
| 6,067,374 | A | * | 5/2000 | Fan et al. | 382/135 |
| 6,328,150 | B1 | * | 12/2001 | Hibari | 194/317 |
| 6,343,204 | B1 | * | 1/2002 | Yang | 399/366 |
| 6,459,809 | B1 | * | 10/2002 | Jensen et al. | 382/203 |

FOREIGN PATENT DOCUMENTS

| | | | |
|---|---|---|---|
| JP | 06-028542 | 2/1994 | G07D/5/00 |
| JP | 06-309543 | 11/1994 | G07D/3/14 |
| JP | 9-293154 | 11/1997 | |
| JP | 11-177893 | 7/1999 | |
| JP | 2001-230977 | 8/2001 | |

* cited by examiner

*Primary Examiner*—Donald P. Walsh
*Assistant Examiner*—Mark J. Beauchaine
(74) *Attorney, Agent, or Firm*—Jordan and Hamburg LLP

(57) ABSTRACT

A discrimination object deflecting apparatus can discriminate and sort medals quickly in an amusement facility or the like. The apparatus is composed of a discrimination section for continuously discriminating continuously moving medals, a passage for continuously moving the discriminated medals according to a discriminating speed of the discrimination section, a deflection passage connected to one side of the passage, a deflection drive section which is provided on the other side of the passage to be countered to the deflection passage and is actuated according to a discriminating signal of the discrimination section and flips the medal moving along the passage towards the deflection passage, and a control section for controlling to drive the deflection drive section according to the discriminating signal of the discrimination section.

20 Claims, 8 Drawing Sheets

DISCRIMINATION OBJECT DEFLECTING APPARATUS

BACKGROUND OF THE INVENTION

1. Field of the Invention

The present invention relates to a discrimination object deflecting apparatus.

2. Description of the Related Art

A medal is a coin-like metal object which is used in a slot machine or the like in an amusement facility is normally rented to a player according to a price rate predetermined in a game parlor where a game is played. Moreover, the player is severely forbidden to take the medals out of the parlor. However, there are a lot of cases that some players rent medals from another parlor or take rented medals out of the parlor and use these medals in another parlor. As a result, there is a fear that another parlor's medals are mixed in a medal game machine or a medal rental machine in the parlor.

At present, it is considered that the most effective means for discriminating proper medals of a specific parlor is to read the design of the medals which is unique to the parlor and extract its characteristic. The image processing apparatus using a solid state image sensing device which is now practical (Japanese Patent Application Laid-Open No. 11-177893 (1999)) can be applied to this medal discrimination. However, since this adopts frame reading for successively reading an area sensor section where pixels are arranged into two-dimensional matrix pattern per line and the image process is executed, there is a fear that the processing time becomes longer and the apparatus itself becomes large and expensive.

On the contrary, the applicants of this invention have already applied for a patent on a solid state image sensing device and on a form discrimination apparatus using the solid state image sensing device with fast processing speed which can be manufactured at lower price (Japanese Patent Application Laid-Open No. 11-351108 (1999)).

Meanwhile, it is necessary to sort medals or the like which are discriminated by the apparatus into the parlor's medals and another parlor's medals, and such a sorting apparatus is shown in FIG. 1 or in Japanese Patent Application Laid-Open No. 9-293154 (1997), for example.

As shown in FIG. 1, this apparatus has a passage 203 for continuously transferring medals 201 to be discriminated after the medals 201 are discriminated. An ejection passage 205 and a reject passage 207 are provided below the passage 203. A partition plate 209 is provided rotatively between the ejection passage 205 and the reject passage 207. When the discriminated medal 201 is the parlor's medal, the partition plate 209 falls to the side of the reject passage 207 so as to block the reject passage 207, the medal 201 is taken out of the ejection passage 205. Moreover, when the medal 201 is judged as another parlor's medal, the partition plate 209 is driven by a motor or the like so as to fall to the side of the ejection passage 205, and the medal 201 is taken out of the reject passage 207.

However, in the case where the medals 201 are discriminated by the discriminating apparatus that processing speed is extremely fast, since the medals 201 continuously move along the passage 203, the pivoting movement of the partition plate 209 between the ejection passage 205 and the reject passage 207 cannot follow the movement of the medals 201, the medal 201 bumps against the partition plate 209 during the pivoting movement so as to be jammed, and defective sorting possibly occurs.

SUMMARY OF THE INVENTION

It is an object of the present invention to provide a discrimination object deflecting apparatus which is capable of fast sorting for fast discrimination and of discriminating objects to be discriminated extremely quickly.

A first aspect of the present invention provides: a discrimination object deflecting apparatus, comprising; a discrimination section for continuously discriminating a moving object to be discriminated and generating a discriminating signal when the moving object is to be discriminated; a passage through which the object to be discriminated moves according to a discriminating speed of the discrimination section; a deflection passage connected to one side of the passage; a deflection drive section having an opening provided on an opposite side of the passage from the deflection passage and a deflection plate arranged in the opening of the deflection drive section; and a control section for controlling the deflection drive section according to the discriminating signal of the discrimination section. The deflection drive section is arranged to protrude the deflection plate into the passage and retract the deflection plate from the passage at high speed in response to the discriminating signal such that the object moving in the passage and to be discriminated is flipped by the deflection plate into the deflection passage upon protruding of the deflection plate into the passage.

A second aspect of the invention provides the discrimination object deflecting apparatus according to the first aspect, wherein the deflection drive section has a deflection plate which can appear on the passage, and a solenoid which appears and drives the deflection plate.

A third aspect of the present invention provides the discrimination object deflecting apparatus according to the first or second aspect, wherein the discrimination section has an area sensor section where pixels for photoelectric conversion are arranged two-dimensionally; the pixels have a photoelectric conversion section for imaging an optical image, a signal comparison section for comparing a signal electrified in the photoelectric conversion section with a reference signal and outputting the result and a signal holding section for holding an output signal of the signal comparison section, and the pixels use a solid state image sensing device, to which address lines are connected respectively for the pixels, and which specifies necessary address lines from the plural address lines and takes out signals into a data line only from the signal holding sections of the pixels specified based on the address signals from the specified address lines; the specified address lines correspond to concentric circles on a disc-shared object to be discriminated; the object to be discriminated being discriminated based on data on the concentric circles taken out by the address signals of the specified address lines. The pixels are arranged in a two-dimensional matrix along the passage for moving disc-shaped objects to be discriminated at a constant speed. The position of the center of a disc-shaped object to be discriminated moving along the passage at the constant speed is determined on the area sensor section according to the position of a pixel that first forms an image of the disc-shaped object to be discriminated among the pixels of the area sensor section.

According to the first aspect of the invention, the deflection drive section is driven by the control of the control section according to the discriminating signal of the discrimination section so that the object to be discriminated can be selectively flipped towards the deflection passage. Therefore, the object to be discriminated is taken out of the deflection passage connected to the one side of the passage so as to be capable of being sorted quickly according to the fast discrimination, and as a result high-speed discrimination can be executed.

According to the second aspect of the invention, in addition to the effect of the first aspect, since the deflection plate which appears and is driven by the solenoid flips the object to be discriminated, the object to be discriminated can be sorted more accurately and quickly.

According to the third aspect of the invention, in addition to the effects of the invention of the first and second aspects, an optical image of the object to be discriminated is imaged by the photoelectric conversion sections of the pixels, and the signal which becomes in the photoelectric conversion section is compared with the reference signal by the signal comparison section, and the output signal of the signal comparison section is held in the signal holding section. Necessary address lines are specified from the address lines connected respectively to the pixels, and the signals held in the signal holding sections are taken out into the data line based on the address signals from the specified address lines. Therefore, a signal is not taken out from all the pixels of the area sensor section but a signal can be taken out from the specified pixel. For this reason, discrimination or the like of a form of the object to be detected is enabled by the signals of the specified pixels without providing an image processing circuit or the like, and thus a processing speed can be heightened. Further, the address lines on the concentric circles of the disc shaped object to be detected are specified, and the object to be detected can be discriminated based on data on the concentric circles taken out by the address signals of the specified address lines so that the discrimination can be made accurately at high processing speed without executing an image process. Therefore, the discrimination section which is capable of making the accurate discrimination at the high processing speed and the deflection drive section are combined so that the discrimination at the high processing speed is overall enabled.

BRIEF DESCRIPTION OF THE DRAWINGS

FIG. 11(*b*) shows data on another concentric circle; and FIG. 11(*c*) shows data on still another concentric circle.

DETAILED DESCRIPTION OF PREFERRED EMBODIMENTS (First Embodiment)

Figure 1:
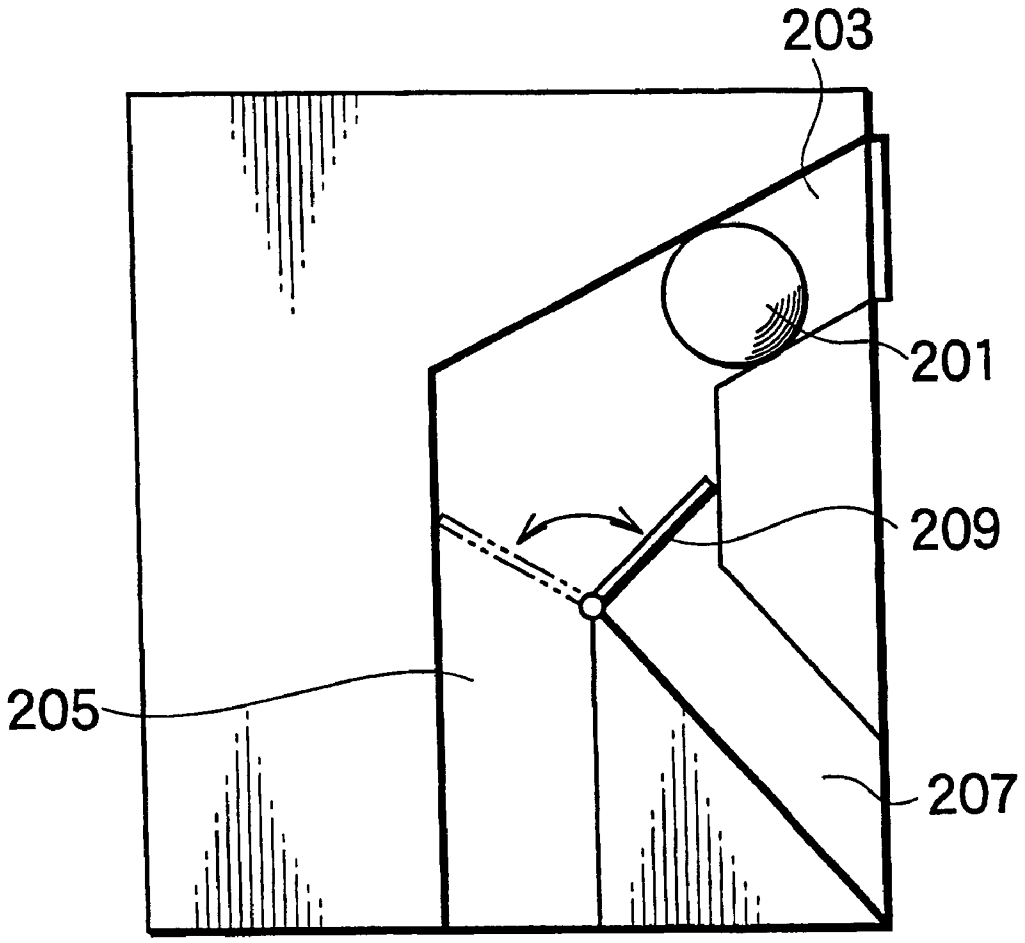
FIG.1 PRIOR ART
FIG. 1 is a schematic diagram according to the prior art.
Figure 2:
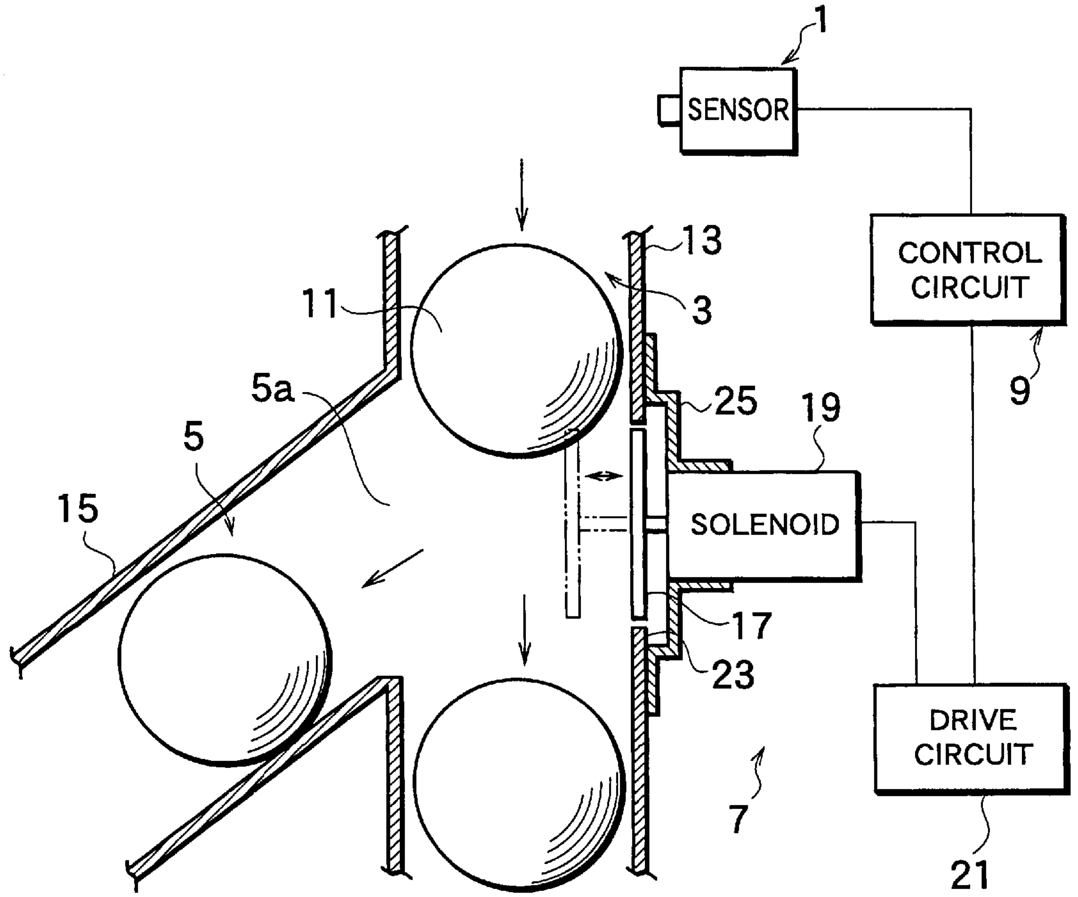
FIG. 2 is a whole schematic diagram according to a first embodiment of the present invention.

FIG. 2 shows a discrimination object deflecting apparatus according to a first embodiment of the present invention. The discrimination object deflecting apparatus is composed of a discrimination section 1, a passage 3, a deflection passage 5, a deflection drive section 7 and a control section 9.

The discrimination section 1 continuously discriminates objects to be discriminated which move continuously, and enables high-speed discrimination. This discrimination form is not particularly limited, but its one example will be explained later.

The passage 3 is used for continuously moving medals 11 as the objects to be discriminated which have been discriminated by the discrimination section 1 according to the discriminating speed of the discrimination section 1. Namely, the passage 3 is formed by a passage wall 13. The passage 3 is for moving, i.e. dropping the medals 11 one by one, and a width and a dimension of the passage 3 in a straight moving direction in the diagram are determined according to diameter and thickness of the medals 11 so that the medals 11 drop freely.

The deflection passage 5 is formed so as to be connected to one side of the passage 3. A deflection port 5*a* with which the deflection passage 5 is connected to the passage 3 is formed so that a dimension in the up-and-down direction is larger than the diameter of the medal 11. Therefore, the medal 11 which is flipped by the deflection drive section 7, mentioned later, can be deflected to the deflection passage 5 easily. The deflection passage 5 is formed by a deflection passage wall 15 which is jointed to the passage wall 13. A width of the deflection passage 5 is larger than the diameter of the medal 11, and its height in the straight moving direction in the diagram is sufficiently larger than the thickness of the medal 11. The deflection passage 5 can be formed also into a shape along a parabola according to a dropping locus of the medal 11 flipped by the deflection drive section 7. In this case, the flipped medal 11 can be taken out of the deflection passage 5 more smoothly.

The deflection drive section 7 is provided to the other side of the passage 3 so as to be countered to the deflection passage 5, and it is operated according to a discriminating signal of the discrimination section 1 so as to selectively flip the medal 11, which moves through the passage 3, towards the deflection passage 5. The deflection drive section 7 has a deflection plate 17 which can appear on the passage 3 and a solenoid 19 which appears to drive the deflection plate 17.

The deflection plate 17 is arranged on an opening 23 formed on the passage wall 13 of the passage 3. A front surface of the deflection plate 17 is flush with an inner surface of the passage wall 13. A height of the deflection plate 17 in the straight moving direction in the diagram is set correspondingly to a height of the passage 3 in the straight moving direction in the diagram, and the deflection plate 17 can appear in the passage 3. A height of the deflection plate 17 in the up-and-down direction in FIG. 2 is smaller than the deflection port 5*a* of the deflection passage 5, and an upper end of the deflection plate 17 is positioned to be lower than an upper end of the deflection port 5*a*, and a lower end of the deflection plate 17 is positioned to be higher than a lower end of the deflection port 5*a*. Therefore, when the medal 11 is flipped by the deflection plate 17, the medal 11 can be put into the deflection port 5*a* easily. Moreover, since the deflection plate 17 has a height in the up-and-down direction, even if the medal 11 slightly shifts from the deflection plate 17 up and down, the medal 11 can be flipped securely towards the deflection port 5*a*.

The solenoid 19 is driven by a drive circuit 21 and is fixed to an outer surface of the passage wall 13 via a bracket 25 by welding or the like. The bracket 25 is fixed to the passage wall 13 with machine screws or the like so as to be detachable.

The control section 9 is composed of a control circuit and controls to drive the deflection drive section 7 according to a discriminating signal of the discrimination section 1. The timing of driving the deflection drive section 7 can be adjusted by previously measuring moving time of the medal 11 from the discrimination in the discrimination section 1 to the position countered to the deflection plate 17 and storing the moving time in the control section 9.

Therefore, the medals 11 are moving continuously and are simultaneously discriminated by the discrimination section 1 and move into the passage 3. The medals 11 continuously drop along the passage 3 according to the high discriminating speed of the discrimination section 1. The discriminating signal of the discrimination section 1 is input into the control section 9, and the drive circuit 21 is driven by the control section 9. When the medal 11 is another parlor's medal, the solenoid 19 is actuated by driving of the drive circuit 21, and the deflection plate 17 instantly moves into the passage 3 as shown by alternate long and two short dashed line so as to be returned into a state shown by a solid line. The medal 11 is flipped by the movement of the deflection plate 17 so as to come from the deflection port 5*a* into the deflection passage 5 so as to be discharged. When the medal 11 is the parlor's medal, the deflection plate 17 does not move, and the medal 11 directly drops in the passage 3.

In such a manner the deflection plate 17 moves at high speed according to the high-speed discrimination by means of the discrimination section 1, and the medals 11 which drop continuously can be sorted securely. When the medal 11 is the parlor's medal, the medal 11 is flipped by the deflection plate 17 so as to be capable of being discharged to the side of the deflection passage 5.

There will be explained below the high-speed driving of the deflection plate 17.

Figure 3:
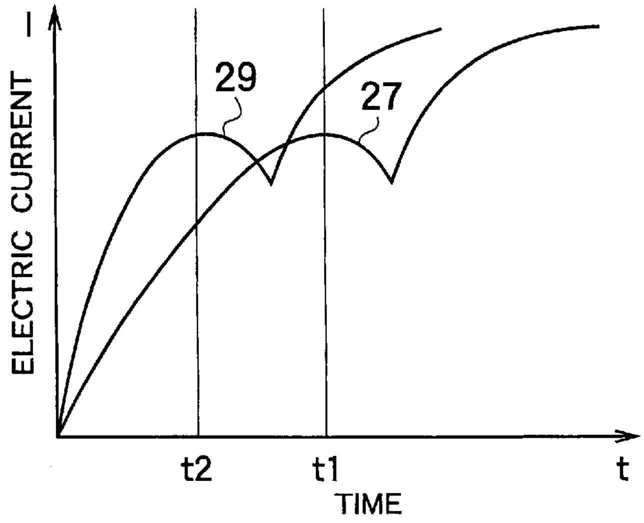
FIG. 3 is a graph showing response time of a solenoid according to the first embodiment.

FIG. 3 shows response time of the solenoid 19. The solenoid 19 with 12 V rating, for example, is used, and coil resistance is 10 ohms, and the solenoid 19 is started to be operated by an electric current of 1.2 A. When a voltage of 12 V is applied to the solenoid 19 with 12 V rating, time t1 required for starting the operation is about 10 ms. When a voltage of 24 V is applied to the solenoid 19, time t2 required for starting the operation becomes 5 ms which is half of the time t1. However, when a voltage of 24 V is applied, there is a fear that the solenoid 19 with 12 V rating will be damaged by a rise of the electric current. Therefore, a constant-current chopper coil shown in FIG. 4 is used so as to apply a voltage Vref (V<Vref), which is higher than the rated voltage V, to the rated voltage V of the solenoid 19, and the solenoid 19 is driven at high speed.

Figure 4:
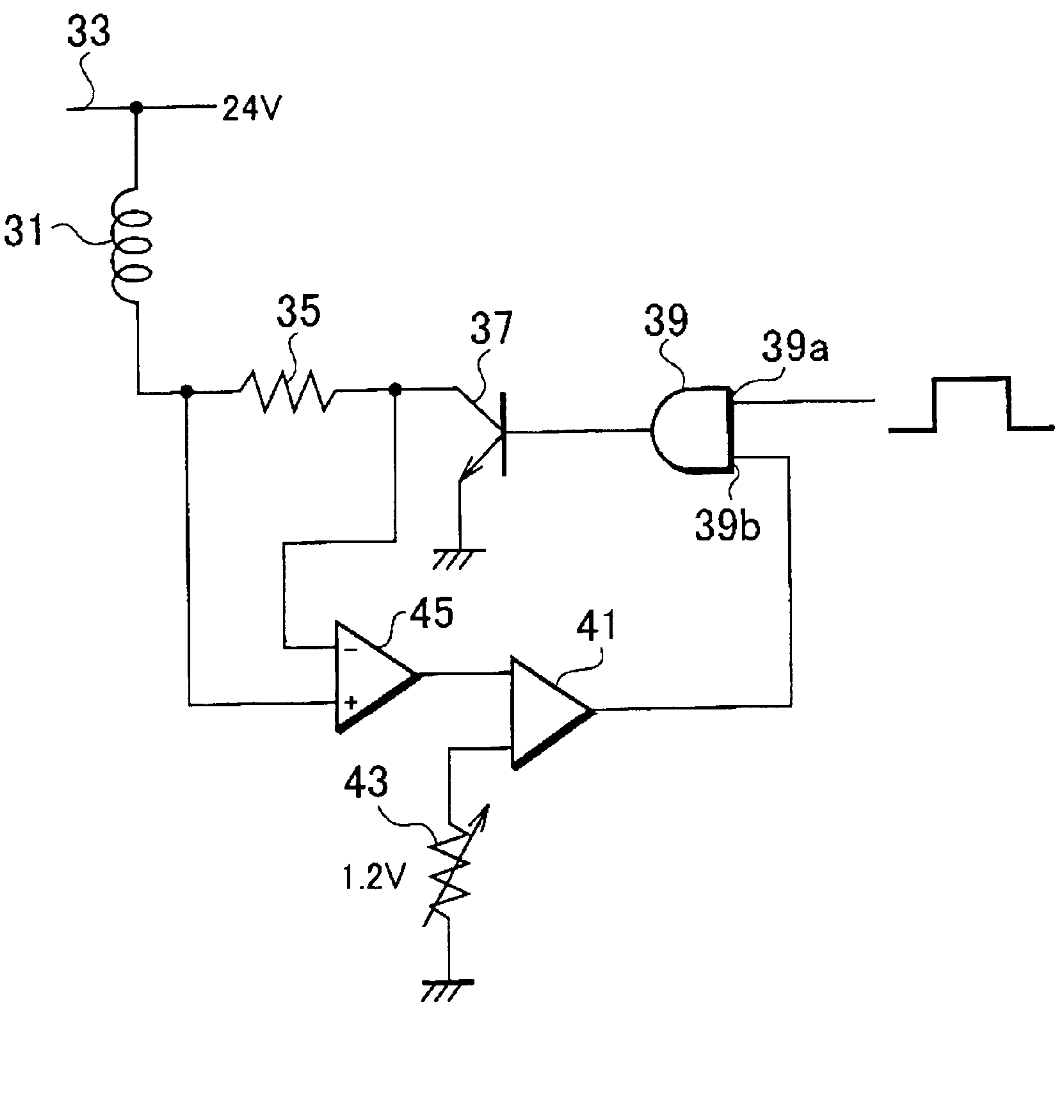
FIG. 4 is an explanatory diagram of a drive circuit according to the first embodiment.

In FIG. 4, one end of a coil 31 of the solenoid 19 is connected with a power source line 33, and the other end is connected with a transistor 37 via a resistor 35 of 1 ohm. An AND circuit 39 is connected to a gate of the transistor 37, and a pulse wave according to detection of another parlor's medal is input from the control section 9 to one terminal 39*a* of the AND circuit 39. Moreover, a comparator 41 is connected to the other terminal 39*b* of the AND circuit 39, and a reference voltage generating section 43 of 1.2 V is connected to the comparator 41. Moreover, an amplifier 45, which is connected to front and rear of the resistor 35, is connected to the comparator 41.

Therefore, when a voltage of 24 V is applied to the power source line 33, voltages of both ends of the resistor 35 are input via the amplifier 45 into the comparator 41, and the output of the comparator 41 is in high level until these voltages become a reference voltage of 1.2 V. Therefore, a signal according to the input pulse is input from the AND circuit 39 into the gate of the transistor 37, and the transistor 37 is turned ON so that the coil 31 is electrified. For this reason, the solenoid 19 can be actuated instantly for the time t2 in FIG. 3.

When the voltages of the both ends of the resistor 35 reach 1.2 V, the output of the comparator 41 is in low level, and the AND circuit 39 does not output a signal regardless of the input pulse. For this reason, the transistor 37 is turned OFF, and electrifying of the coil 31 is stopped, and the electric current does not further rise on the coil 31 so that the coil 31 can be protected.

When the a voltage of 24 V is applied to the solenoid 19 with 12 V rating in such a manner, the extremely quick operation is enabled, and the medals 11 can be sorted at high speed by the solenoid 19 according to the high-speed discrimination by means of the discrimination section 1. The drive circuit 21 is such that the circuit shown in FIG. 4 is configured into a bridge form and the solenoid 19 can be converted. Moreover, instead of the circuit shown in FIG. 4, a load on the coil 31 is considered as constant, and time corresponding to the time t2 is measured by an actual load so that a drive pulse can be previously set by the measured result. In this method, the resistor 35, the comparator 41 and the like shown in FIG. 4 can be omitted so that the structure can be simplified.

Figure 5:
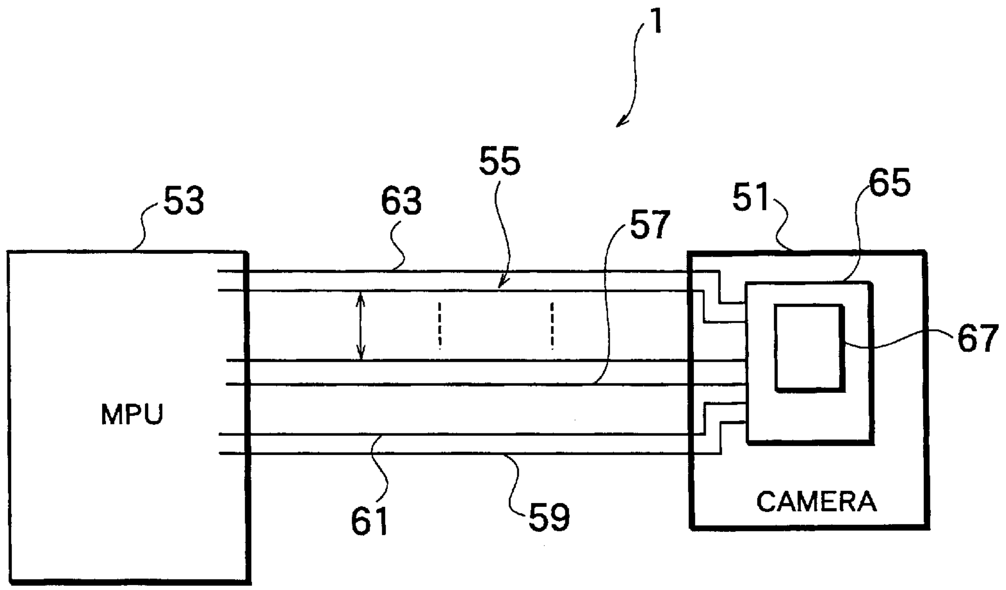
FIG. 5 is a block diagram showing a discrimination section according to the first embodiment.

FIG. 5 is a block diagram of the discrimination section 1, and shows a state that a camera 51 is connected to an MPU 53. As types of the connection, there exist a plurality of address lines 55, a reset line 57, a data line 59, a chip select line 61 and a shutter line 63.

The camera 51 has a solid state image sensing device 65, and the solid state image sensing device 65 has an area sensor section 67. As the solid state image sensing device 65, for example, a CMOS sensor is used. A CCD sensor can be also used.

The CMOS sensor 65 is constituted so that unit cells as pixels are arranged on the area sensor section 67 laterally and vertically in a two-dimensional matrix pattern. A number of the unit cells is several hundred×several hundred, for example.

Figure 6:
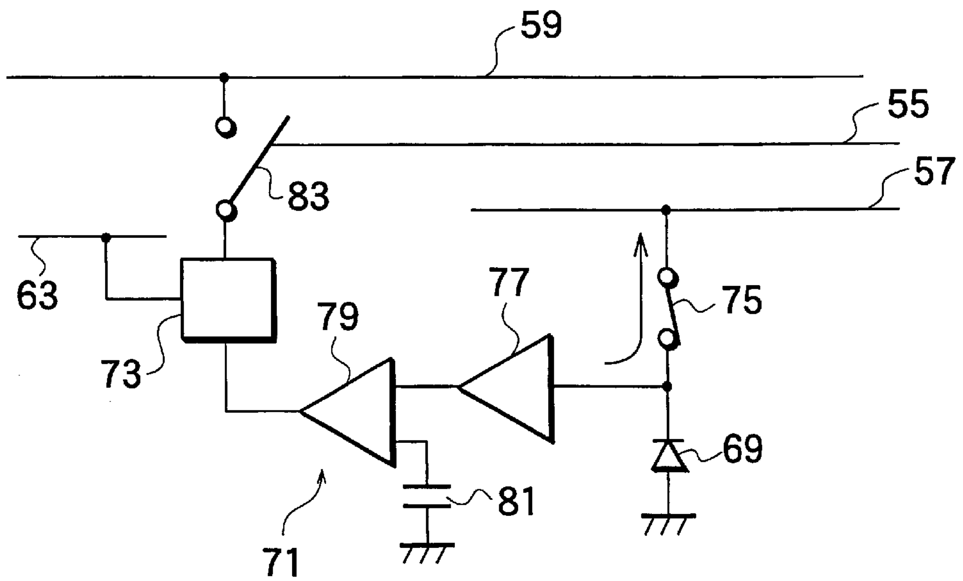
FIG. 6 is a circuit diagram of a unit cell according to the first embodiment.

The structure of the unit cells is as shown in FIG. 6. Namely, this structure has a photodiode 69 as a photoelectric conversion section, a signal comparison section 71 for comparing a signal converted into electric charges by means of the photodiode 69 with a reference signal so as to output the signal, and a signal holding circuit 73 as a signal holding section for holding the output signal of the signal comparison section 71.

The photodiode 69 detects an incident light and images an optical image. Moreover, the photodiode 69 generates signal electric charges according to a received light amount, and one photodiode 69 composes one pixel. The photodiode 69 is connected to the reset line 57 via a reset transistor 75. Only one reset line 57 exists in the present embodiment, and all the photodiodes 69 of all the unit cells are connected to one reset line 57.

The signal comparator 71 is composed of an amplifying circuit 77 and a comparison circuit 79. The amplifying circuit 77 amplifies the signal converted into the electric charges by the photodiode 69 so as to output it to the comparison circuit 79. The comparison circuit 79 compares a reference voltage from a reference voltage generating section 81 with the output voltage signal from the amplifying circuit 77 so as to output a signal of 1 or 0 according to the electric charge storage level.

The reference voltage generating section 81 may be provided for each unit cell, but the reference voltage can be set as a general reference voltage by drawing a line from the outside. Here, the level of the reference voltage can be varied.

The signal holding circuit 73 is composed of, for example, a D type flip-flop circuit, and is connected to the data line 59 via a reading transistor 83. One data line 59 exists in the present embodiment, and the signal holding circuits 73 of the respective unit cells are connected to the data line 59.

The shutter line 63 is connected to the signal holding circuit 73. One shutter line 63 is provided in the present embodiment, and the signal holding circuits 73 of the respective unit cells are connected to the shutter line 63. A clock signal is input as an electronic shutter into the shutter line 63 at timing of 1/1000s to 1/4000s. At this timing, the signal holding circuit 73 holds the signal of 1 or 0 from the comparison circuit 79.

One of the address lines 55 is connected to the reading transistor 83. The address lines 55 are connected for the respective unit cells, and as mentioned above the plural address lines 55 are provided. A necessary address line 55 is specified from the plural address lines 55 by a decoder, provided to the MPU 53. The address lines 55 are specified at the timing which synchronizes with the clock signal, for example.

The chip select line 61 is switched between "high" and "low", and when the chip select line 61 is high, the data line 59 becomes high.

When a rest pulse is applied to the reset line 7, the reset transistor 75 is turned on by the reset pulse, and the signal electric charges stored in the photodiode 69 are discharged via the reset transistor 75. As a result, the photodiode 69 is reset. After the photodiode 69 is reset, an optical image is imaged and the signal electric charges are stored. The stored signal electric charges are amplified by the amplifying circuit 77 and are compared with the reference voltage by the comparison circuit 79 so that the signal of 1 or 0 is output. The signal holding circuit 73 holds the signal of 1 or 0 at the timing of the clock signal of the shutter line 63.

Figure 7:
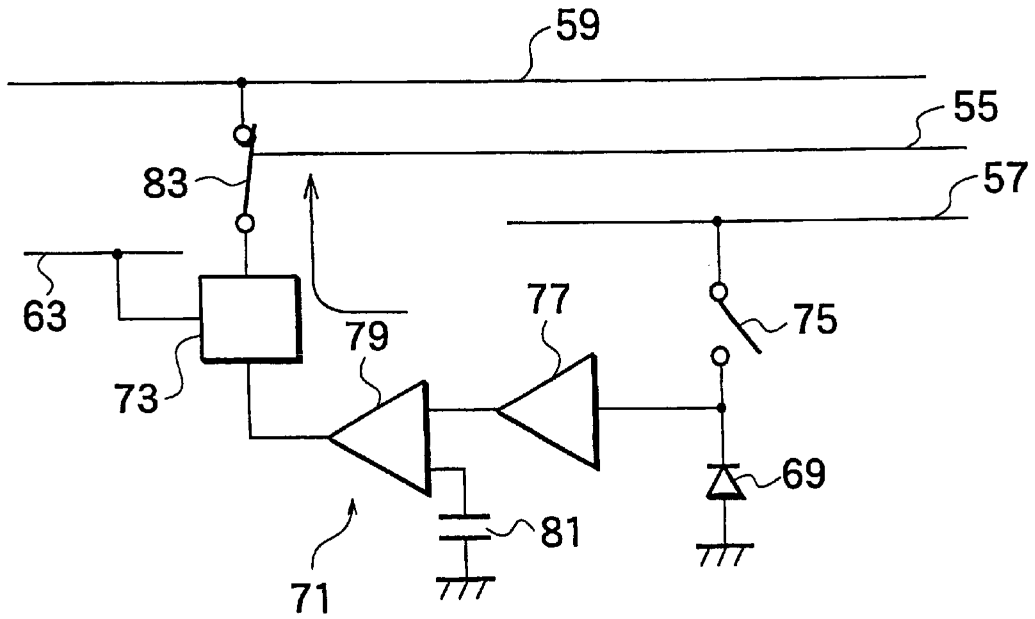
FIG. 7 is a function explanatory diagram of the unit cell according to the first embodiment.

Meanwhile, necessary address lines 55 are specified from the plural address lines 55 by calculation in the MPU 53, and when address signals are successively input from the specified address lines 55 into the reading transistors 83 having one to one correspondence to the address lines 55 in synchronization with the clock signal, the reading transistors 83 are turned on as shown in FIG. 7, and signals are taken out from the signal holding circuits 73 into the data line 59.

Therefore, necessary address lines 55 are specified from the plural address lines 55 connected to the pixels respectively, and signals can be taken out only from the specified pixels based on the address signals of the specified address lines 55 into the data line 59.

A surface form or the like of an object to be discriminated such as a medal can be discriminated by the comparison process, mentioned later, of the signals from the data line 59, and in comparison with the case where the image process is executed by frame reading, this comparison process extremely heightens the reading speed and the speed of the signal process. Moreover, since only the comparison process on the signals from the data line 59 is simply executed and a special image process is not executed, the structure is extremely simple, and the apparatus can be miniaturized and manufactured at low costs.

There will be explained below the high-speed medal discrimination with reference to FIGS. 8 to 11.

Figure 8:
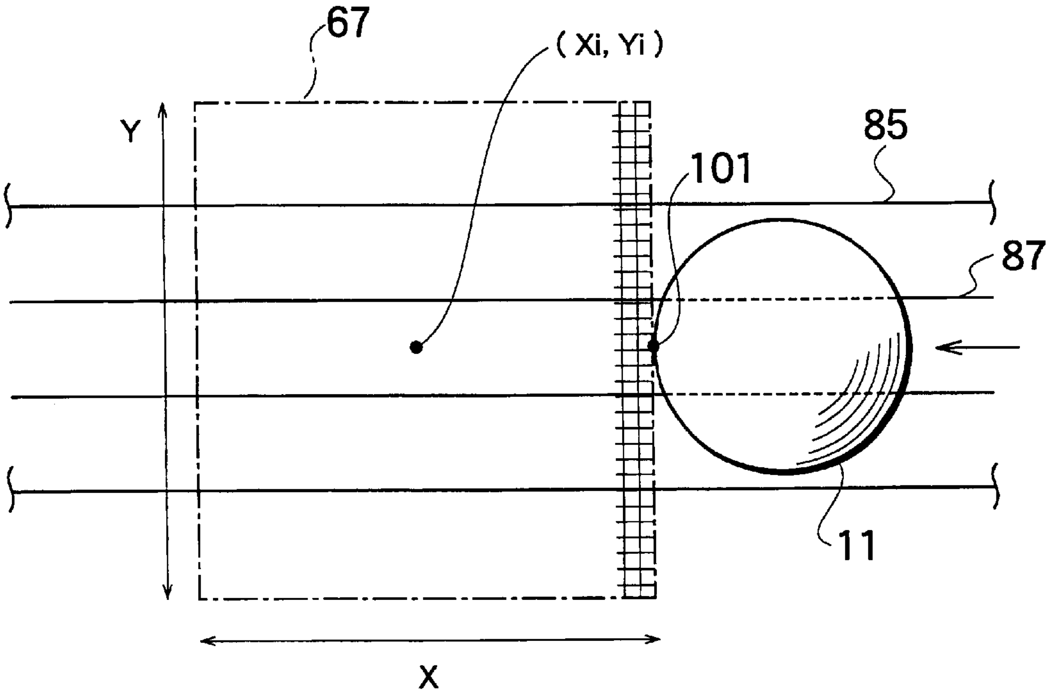
FIG. 8 is a schematic plan view of the discrimination section according to the first embodiment.

FIG. 8 shows a relationship between the area sensor section 67 and a passage 85. As shown in FIG. 8, the passage 85 is provided with a belt 87 at the approximately center portion in its widthwise direction, and the medal 11 as a disc shaped object to be detected on the belt 87 moves at constant speed on the passage 85 according to running of the belt 87 to a direction of an arrow.

Figure 9:
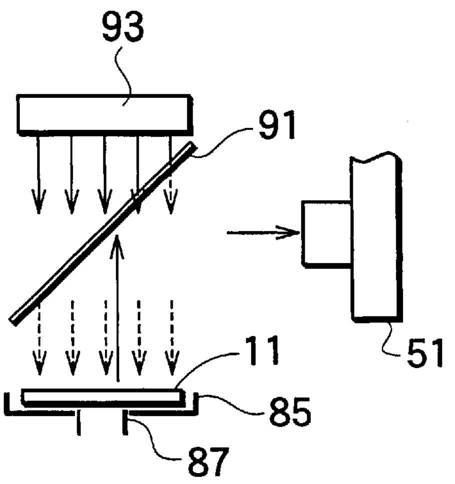
FIG. 9 is an arrangement structural diagram of the discrimination section according to the first embodiment.

The area sensor section 67 is provided to the solid state image sensing device of the camera 51 in FIG. 9, and the arrangement is actually as shown in FIG. 9 in the relationship with the passage 85. Namely, a half mirror 91 which is tilted at 450 is provided onto the passage 85, and a light 93 is disposed above the half mirror 91. Moreover, the camera 51 is disposed on the side of the half mirror 91.

As a result, a light from the light 93 transmits through the half mirror 91, and the light reflected by the medal 11 is reflected by the half mirror 91 and is input into the camera 51. With such an arrangement structure, the camera 51 and the light 93 can be arranged compactly on the passage 85. However, if a space is available, a structure which does not use the half mirror 91 can be used.

Figure 10:
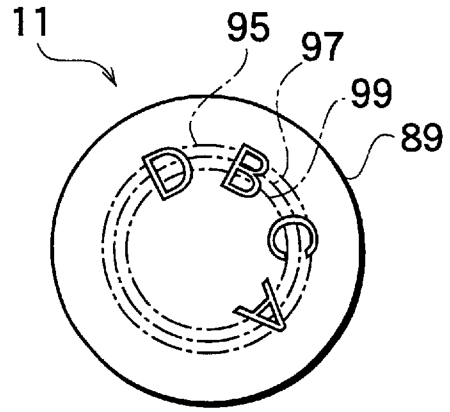
FIG. 10 is a plan view of a medal.
Figure 11:
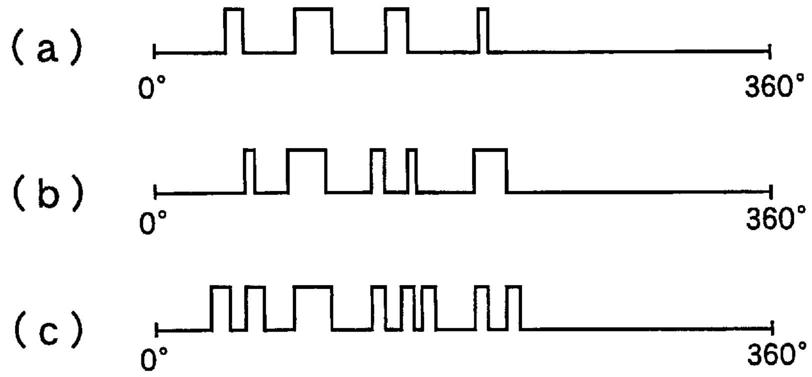
FIG. 11(*a*) shows data of the medal on one concentric circle.

The address lines 55 specified for a medal 89 is on the concentric circles 95, 97 and 99 shown by three alternate long and two short dashed lines in FIG. 10, and the medal 11 is discriminated based on data of the concentric circles 95, 97 and 99 taken out by the address signals of the specified address lines 55. Examples of the data of the concentric circles 95, 97 and 99 are shown in FIG. 11. FIG. 11(*a*) shows the data on the concentric circle 95, FIG. 11(*b*) shows the data on the concentric circle 97, and FIG. 11(*c*) shows the data on the concentric circle 99. In FIG. 9, characters D, B, C and A are embossed on the surface of the medal 11, and the reflected lights of the portions of the characters become stronger than the other portion so as to be the portion of the signal of 1 in FIG. 11, and the other portion is the portion of the signal of 0. If the characters are engraved on the surface of the medal 89, the portions of the characters can be detected as 0 and the other portion can be detected as 1. In the present embodiment, the three data on the concentric circles are taken, but this is because the detecting accuracy is improved. Therefore, a number of data may be 1, 2 or not less than 4 according to a required degree of the detecting accuracy.

When the medal 11 shifts to a direction Y in FIG. 8 from the passage 85, the positions of the address lines 55 on the concentric circles 95, 97 and 99 shift with respect to the area sensor section 67. Accordingly, the specifying positions of the address lines 55 on the concentric circles 95, 97 and 99 shift, but in this case, the address lines 55 are specified properly in the following manner.

As shown in FIG. 8 for example, when the medal 11 moves to the area sensor section 67, a position of a pixel 101 on which the medal 11 is firstly imaged is specified from the pixels. Since the belt 87 of the medal 11 moves at the constant speed, a center position (Xi, Yi) of the medal 11 with respect to the area sensor section 67 is specified by the constant speed and the position of the pixel 101. The address lines 55 for specifying the concentric circles 95, 97 and 99 can be determined based on the center position (Xi, Yi). The address lines 55 are specified in such a manner that the MPU 53 makes a calculation and a signal is input into the decoders of the address lines 55 and the data are taken out from the data line 59 as mentioned above, and the data shown in FIG. 11 can be obtained.

The data shown in FIG. 11 are taken once by using the first proper medal 11 as a reference workpiece, and the data are stored in a memory. A next medal is used as a comparison workpiece so that data are obtained similarly, and the obtained data are compared with the data in FIG. 11. When both the data match each other, the compared result is the identical medals, and they do not match each other, a judgment is made as different medals.

As for the respective medals 11 which move along the passage 85, since their rotary positions are random and different, even if the data of the identical medals 11 are taken and are compared with each other, they do not always match each other. Therefore, the data on the concentric circles 95, 97 and 99 of 360° are taken, and when the rotary positions shift, data that the rotary angle is deviated can be taken. Therefore, the rotary angles are adjusted on the data by calculation of the MPU 53 so that matched/unmatched state can be discriminated easily.

As a result, a discrimination can be made as to whether medals which are used in a slot machine or the like in an amusement facility are the parlor's medals or another parlor's medals, and the medals can be discriminated easily.

In the case of the frame reading, an area sensor section of the same size as the present embodiment takes about 30 ms to read, and thus only 10 to 12 medals can be discriminated for 1 sec. However, in the present embodiment, more medals can be discriminated quickly. For example as described above, when a sampling number of the three concentric circles 95, 97, 99 is 768 points, the access time for unit cell is 50 ns to 100 ns, and 38,400 ns to 76,800 ns is the whole reading time, and about 100 medals can be fed for 1 sec. Therefore, the medals can be discriminated at an extremely fast processing speed.

In such a manner, the medals 11 continuously drop along the passage 3 according to the discrimination at extremely fast processing speed by means of the discrimination section 1, but the medals 11 can be flipped to the side of the deflection passage 5 at extremely fast speed by high-speed reciprocation of the deflection plate 17 by means of the solenoid 19, and the medals 11 can be sorted accurately at high speed.

(Second Embodiment)

Figure 12:
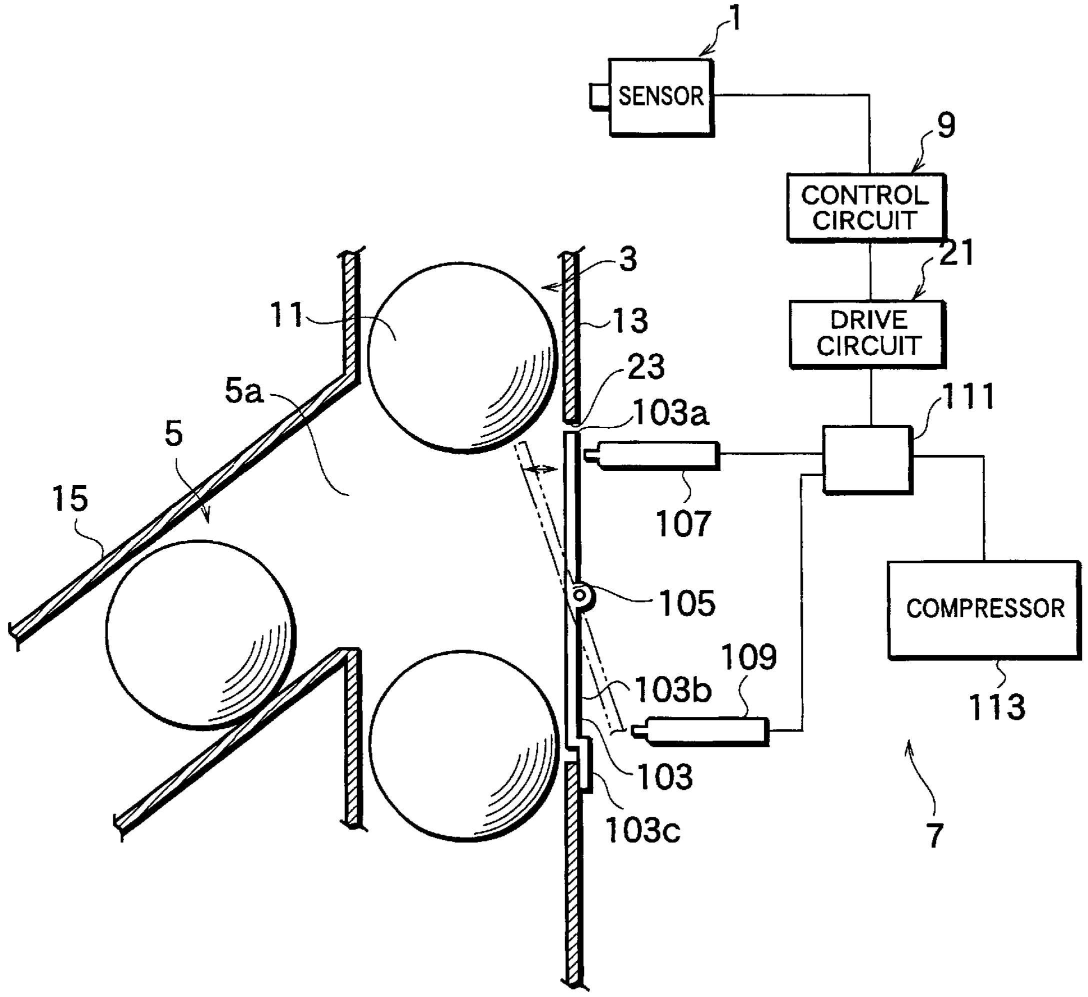
FIG. 12 is a whole schematic diagram according to a second embodiment of the present invention.

FIG. 12 shows the second embodiment of the present invention. The same reference numerals are given to the components corresponding to those in the first embodiment. In the present embodiment, compressed air is used to drive the deflection plate.

Namely, as shown in FIG. 12, a deflection plate 103 is supported to the passage wall 13 by a rotary axis 105, and its upper portion 103*a* can pivot into the passage 3. An applying force is applied to the deflection plate 103 to a clock wise direction in the diagram by a torque spring around the rotary axis 105 which intervenes between the deflection plate 103 and the passage wall 13. An engagement portion 103*c*, which is engaged with the passage wall 13, is provided to the lower end of the deflection plate 103, and the engagement portion 103*c* is engaged with the passage wall 13 by the applying force of the locating spring so that the deflection plate 103 is located in a state shown by the solid line.

Nozzles 107 and 109 are disposed on a rear of the deflection plate 103. The upper nozzle 107 is disposed so as to be close to the rear of the upper portion 103*a* of the deflection plate 103. The lower nozzle 109 is disposed slightly separately from the rear of the lower portion 103*b* of the deflection plate 103 so that the pivoting of the deflection plate 103 is allowed. The nozzles 107 and 109 are connected to a compressor 113 via a solenoid valve 111. The solenoid valve 111 is electrically connected to the drive circuit 21.

The compressed air of the compressor 113 can be supplied to one of the nozzles 107 and 109 switched by the solenoid valve 111. The switching by means of the solenoid valve 111 can be made by the above-mentioned high-speed driving by means of the drive circuit 21. Therefore, when the medals 11 are another parlor's medals, the compressed air is blown from the nozzle 107 to the upper portion 103*a* of the deflection plate 103, and the deflection plate 103 pivots on the rotary axis 105 to the state shown by the alternate long and two short dashed line. The medal 11 is flipped by the upper portion 103*a* of the deflection plate 103 due to the pivoting of the deflection plate 103 so as to be deflected to the deflection passage 5. When the deflection plate 103 pivots to the position shown by the alternate long and two short dashed line, the lower portion 103*b* abuts against the nozzle 109 so that the pivoting is restricted, and the deflection plate 103 does not further pivot. In addition to the nozzle 109, locating means is provided so as to capable of making the locating shown by the alternate long and two short dashed line.

At next instant, the solenoid valve 111 is switched by the drive circuit 21, and the compressed air is blown from the nozzle 109 to the lower portion 103*b* of the deflection plate 103, and the deflection plate 103 pivots to return to the position shown by the solid line instantly in cooperation with the return spring around the rotary axis 105. In this position, the engagement portion 103*c* is engaged with the passage wall 13 so as that the deflection plate 103 is located.

Also in this embodiment, the medal 11 can be flipped at high speed and can be sorted at high speed according to the high-speed discrimination by means of the discrimination section 1.

The object to be discriminated can be applied to a coin as circulating medium and the others as well as the above medal 11. Moreover, the passage 3 is not limited to the passage for dropping the medal 11 vertically, the passage 3 can be constituted also as a passage for dropping the medal slantly or a passage for moving the medal 11 by means of a belt similarly to the discrimination section 1, and the like.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A discrimination object deflecting apparatus, comprising;

a discrimination section for continuously discriminating a moving object to be discriminated and generating a discriminating signal when the moving object is to be discriminated;

a passage through which the object to be discriminated moves according to a discriminating speed of said discrimination section;

a deflection passage connected to one side of said passage;

a deflection drive section having an opening provided on an opposite side of said passage from said deflection passage such that said opening of said deflection drive section is opposite said deflection passage and a deflection plate arranged in said opening of said deflection drive section, said deflection drive section being arranged to protrude said deflection plate into said passage and retract said deflection plate from said passage at high speed in response to the discriminating signal such that an object moving in said passage and to be discriminated is flipped by said deflection plate into said deflection passage upon protruding of said deflection plate into said passage; and a control section for controlling said deflection drive section according to the discriminating signal of said discrimination section such that when an object in said passage is to be discriminated, said deflection plate is protruded into said passage and when an object in said passage is not being discriminated, said deflection plate is not protruded into said passage.

2. The discrimination object deflecting apparatus according to claim 1, wherein said deflection drive section further includes a solenoid which drives said deflection plate.

3. The discrimination object deflecting apparatus according to claim 2, wherein:

said discrimination section has an area sensor section where pixels for photoelectric conversion are arranged two-dimensionally;

the pixels have a photoelectric conversion section for imaging an optical image, a signal comparison section for comparing a signal electrified in the photoelectric conversion section with a reference signal and outputting the result and a signal holding section for holding an output signal of the signal comparison section, and the pixels use a solid state image sensing device, to which address lines are connected respectively for the pixels, and which specifies necessary address lines from the plural address lines and takes out signals into a data line only from the signal holding sections of the pixels specified based on the address signals from the specified address lines;

the specified address lines correspond to concentric circles on a disc-shaped object to be discriminated;

the object to be discriminated being discriminated based on data on the concentric circles taken out by the address signals of the specified address lines;

the pixels are arranged in a two-dimensional matrix along said passage for moving disc-shaped objects to be discriminated at a constant speed; and the position of the center of a disc-shaped object to be discriminated moving along said passage at the constant speed is determined on said area sensor section according to the position of a pixel that first forms an image of the disc shaped object to be discriminated among the pixels of said area sensor section.

4. The discrimination object deflecting apparatus according to claim 1, wherein:

said discrimination section has an area sensor section where pixels for photoelectric conversion are arranged two-dimensionally;

the pixels have a photoelectric conversion section for imaging an optical image, a signal comparison section for comparing a signal electrified in the photoelectric conversion section with a reference signal and outputting the result and a signal holding section for holding an output signal of the signal comparison section, and the pixels use a solid state image sensing device, to which address lines are connected respectively for the pixels, and which specifies necessary address lines from the address lines and takes out signals into a data line only from the signal holding sections of the pixels specified based on the address signals from the specified address lines;

the specified address lines correspond to concentric circles on a disc-shaped object to be discriminated;

the object to be discriminated being discriminated based on data on the concentric circles taken out by the address signals of the specified address lines;

the pixels are arranged in a two-dimensional matrix along said passage for moving disc-shaped objects to be discriminated at a constant speed; and the position of the center of a disc-shaped object to be discriminated moving along said passage at the constant speed being determined on said area sensor section according to the position of a pixel that first forms an image of the disc shaped object to be discriminated among the pixels of said area sensor section.

5. The discrimination object deflecting apparatus according to claim 1, wherein said deflection plate is positioned opposite a deflection port of said deflection passage with said passage being interposed between said deflection plate and said deflection port of said deflection passage.

6. The discrimination object deflecting apparatus according to claim 5, wherein said deflection plate has a vertical dimension smaller than a vertical dimension of said deflection port of said deflection passage.

7. The discrimination object deflecting apparatus according to claim 5, wherein said deflection plate has an upper end positioned lower in a vertical direction than an upper end of said deflection port of said deflection passage and a lower end positioned higher in the vertical direction than a lower end of said deflection port of said deflection passage.

8. The discrimination object deflecting apparatus according to claim 5, wherein said deflection drive section is arranged to move said deflection plate in its entirety in a direction toward said deflection port of said deflection passage.

9. The discrimination object deflecting apparatus according to claim 1, wherein said passage is defined by a passage wall, said opening being formed in said passage wall.

10. The discrimination object deflecting apparatus according to claim 9, wherein a front surface of said deflection plate is flush with an inner surface of said passage wall.

11. The discrimination object deflecting apparatus according to claim 9, wherein said deflection drive section further includes a solenoid which drives said deflection plate, further comprising a bracket for attaching said solenoid to an outer surface of said passage wall.

12. The discrimination object deflecting apparatus according to claim 1, wherein said deflection drive section is arranged to move said deflection plate in its entirety in a direction toward said deflection passage.

13. A discrimination object deflecting apparatus, comprising;

a discrimination section for continuously discriminating a moving object to be discriminated and generating a discriminating signal when the moving object is to be discriminated;

a passage through which the object to be discriminated moves according to a discriminating speed of said discrimination section;

a deflection passage connected to one side of said passage;

a deflection drive section having an opening provided on an opposite side of said passage from said deflection passage such that said opening of said deflection drive section is opposite said deflection passage and a deflection plate arranged in said opening of said deflection drive section, said deflection drive section being arranged to move said deflection plate between a first position in which said deflection plate is not situated in said passage and a second position in which said deflection plate is situated in its entirety in said passage at high speed in response to the discriminating signal such that an object moving in said passage and to be discriminated is flipped by said deflection plate into said deflection passage upon movement of said deflection plate from said first position to said second position; and a control section for controlling said deflection drive section according to the discriminating signal of said discrimination section such that when an object in said passage is to be discriminated, said deflection plate is moved into said second position in said passage and when an object in said passage is not being discriminated, said deflection plate is kept in said first position.

14. The discrimination object deflecting apparatus according to claim 13, wherein said deflection drive section further includes a solenoid which drives said deflection plate.

15. The discrimination object deflecting apparatus according to claim 13, wherein:

said discrimination section has an area sensor section where pixels for photoelectric conversion are arranged two-dimensionally;

the pixels have a photoelectric conversion section for imaging an optical image, a signal comparison section for comparing a signal electrified in the photoelectric conversion section with a reference signal and outputting the result and a signal holding section for holding an output signal of the signal comparison section, and the pixels use a solid state image sensing device, to which address lines are connected respectively for the pixels, and which specifies necessary address lines from the address lines and takes out signals into a data line only from the signal holding sections of the pixels specified based on the address signals from the specified address lines;

the specified address lines correspond to concentric circles on a disc-shaped object to be discriminated;

the object to be discriminated being discriminated based on data on the concentric circles taken out by the address signals of the specified address lines;

the pixels are arranged in a two-dimensional matrix along said passage for moving disc-shaped objects to be discriminated at a constant speed; and the position of the center of a disc-shaped object to be discriminated moving along said passage at the constant speed being determined on said area sensor section according to the position of a pixel that first forms an image of the disc shaped object to be discriminated among the pixels of said area sensor section.

16. The discrimination object deflecting apparatus according to claim 13, wherein said deflection plate is positioned opposite a deflection port of said deflection passage with said passage being interposed between said deflection plate and said deflection port of said deflection passage.

17. The discrimination object deflecting apparatus according to claim 16, wherein said deflection plate has a vertical dimension smaller than a vertical dimension of said deflection port of said deflection passage.

18. The discrimination object deflecting apparatus according to claim 16, wherein said deflection plate has an upper end positioned lower in a vertical direction than an upper end of said deflection port of said deflection passage and a lower end positioned higher in the vertical direction than a lower end of said deflection port of said deflection passage.

19. The discrimination object deflecting apparatus according to claim 13, wherein said passage is defined by a passage wall, said opening being formed in said passage wall.

20. The discrimination object deflecting apparatus according to claim 19, wherein a front surface of said deflection plate is flush with an inner surface of said passage wall.

* * * * *